United States Patent
Takahashi et al.

(10) Patent No.: US 10,207,714 B2
(45) Date of Patent: Feb. 19, 2019

(54) CONTROL DEVICE FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Seiichiro Takahashi, Isehara (JP); Hiroki Iwasa, Sagamihara (JP); Hironori Miyaishi, Sagamihara (JP); Sunghoon Woo, Atsugi (JP); Takaaki Matsui, Fuji (JP); Tomoaki Honma, Isehara (JP); Yoshio Yasui, Fuji (JP); Yuta Suzuki, Sagamihara (JP); Masayuki Mannen, Fuji (JP); Susumu Saitou, Moka (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 245 days.

(21) Appl. No.: 15/114,885

(22) PCT Filed: Jan. 7, 2015

(86) PCT No.: PCT/JP2015/050204
§ 371 (c)(1),
(2) Date: Jul. 28, 2016

(87) PCT Pub. No.: WO2015/118895
PCT Pub. Date: Aug. 13, 2015

(65) Prior Publication Data
US 2016/0339921 A1 Nov. 24, 2016

(30) Foreign Application Priority Data
Feb. 7, 2014 (JP) .................................. 2014-022735

(51) Int. Cl.
*B60W 10/02* (2006.01)
*B60W 30/19* (2012.01)
(Continued)

(52) U.S. Cl.
CPC .......... *B60W 30/19* (2013.01); *B60W 10/026* (2013.01); *B60W 10/107* (2013.01);
(Continued)

(58) Field of Classification Search
None
See application file for complete search history.

(56) References Cited

U.S. PATENT DOCUMENTS

| 5,095,776 A * | 3/1992 | Sato | ...................... | B60W 10/06 192/3.31 |
| 6,554,737 B1 * | 4/2003 | Vorndran | .............. | F16H 61/143 477/176 |

FOREIGN PATENT DOCUMENTS

| JP | 60-143267 A | 7/1985 |
| JP | 2010-133451 A | 6/2010 |

* cited by examiner

*Primary Examiner* — Jacob S. Scott
(74) *Attorney, Agent, or Firm* — Foley & Lardner LLP

(57) ABSTRACT

Control device for continuously variable transmission has continuously variable transmission mechanism (CVT) transmitting power with belt (7) wound around primary and secondary pulley (5, 6); torque convertor (2) having pump impeller (20), turbine runner (21) and lock-up clutch (2*a*); and control unit (10) controlling lock-up clutch (2*a*) to predetermined engagement state and controlling the CVT to predetermined transmission ratio, according to travelling condition. Control unit (10) is configured to, when shifting lock-up clutch (2*a*) from disengagement to engagement state, control transmission ratio of CVT so that when rotation speed difference ($\Delta N$) between engine speed (Ne) and turbine speed (Nt) that is rotation speed of turbine runner is (Continued)

predetermined rotation speed difference ($\Delta N1$) or less, turbine speed (Nt) approaches engine speed (Ne) more than turbine speed (Nt1) of case where control of transmission ratio of CVT, which is set according to travelling condition during shift of lock-up clutch (2a), is continued.

6 Claims, 3 Drawing Sheets

(51) Int. Cl.
*F16H 61/14* (2006.01)
*B60W 10/107* (2012.01)
*F16H 61/662* (2006.01)

(52) U.S. Cl.
CPC ..... *F16H 61/143* (2013.01); *F16H 61/66259* (2013.01); *B60W 2510/0233* (2013.01); *B60W 2510/0638* (2013.01); *B60W 2710/024* (2013.01); *B60W 2710/1005* (2013.01)

CONTROL DEVICE FOR CONTINUOUSLY VARIABLE TRANSMISSION

The present invention relates to a control device for a continuously variable transmission mounted on a vehicle having a torque converter between an engine and a continuously variable transmission mechanism.

BACKGROUND ART

Patent Document 1 discloses a technique of varying a control gain of a lock-up clutch of a torque converter according to a fluid temperature when slip-controlling the lock-up clutch.

However, in a case where the slip-control is affected by friction characteristics of the clutch, even though the control gain is varied according to the fluid temperature, it is difficult to achieve a proper slip-control.

The present invention was made in view of the above problem. An object of the present invention is therefore to provide a control device for the continuously variable transmission which is capable of achieving a stable engagement of the lock-up clutch.

CITATION LIST

Patent Document

Patent Document 1: Japanese Unexamined Patent Application Publication Tokkai-sho 60-143267 (JPS60143267)

SUMMARY OF THE INVENTION

In order to achieve the above object, a control device for a continuously variable transmission comprises: a continuously variable transmission mechanism transmitting power with a belt wound around a primary pulley and a secondary pulley; a torque convertor provided between an engine and the continuously variable transmission mechanism, the torque convertor having a pump impeller rotating integrally with the engine, a turbine runner rotating integrally with an input shaft of the continuously variable transmission mechanism and a lock-up clutch connecting the pump impeller and the turbine runner; and a control unit controlling the lock-up clutch to a predetermined engagement state and controlling the continuously variable transmission mechanism to a predetermined transmission ratio, according to a travelling condition, and the control unit is configured to, when shifting the lock-up clutch from a disengagement state to an engagement state, control a transmission ratio of the continuously variable transmission mechanism so that when a rotation speed difference between an engine rotation speed and a turbine rotation speed that is a rotation speed of the turbine runner is a predetermined rotation speed difference or less, the turbine rotation speed approaches the engine rotation speed more than a turbine rotation speed of a case where control of a transmission ratio of the continuously variable transmission mechanism, which is set according to the travelling condition during the shift of the lock-up clutch, is continued.

Therefore, since the turbine rotation speed approaches the engine rotation speed before the lock-up clutch is in a fully engaged state, torque amplification effect of the torque convertor can be suppressed at an early stage without excessively lowering the engine rotation speed when the lock-up clutch is fully engaged. Further, the lock-up clutch can be shifted from the disengagement state to the engagement state while lightening an engine load by suppressing the lowering of the engine rotation speed, and even if there are variations in coefficient of friction, the lock-up clutch can be stably fully engaged. It is therefore possible to prevent odd or awkward feeling associated with change of longitudinal acceleration from being given to a driver.

EMBODIMENTS FOR CARRYING OUT THE INVENTION

Embodiment 1

Figure 1:
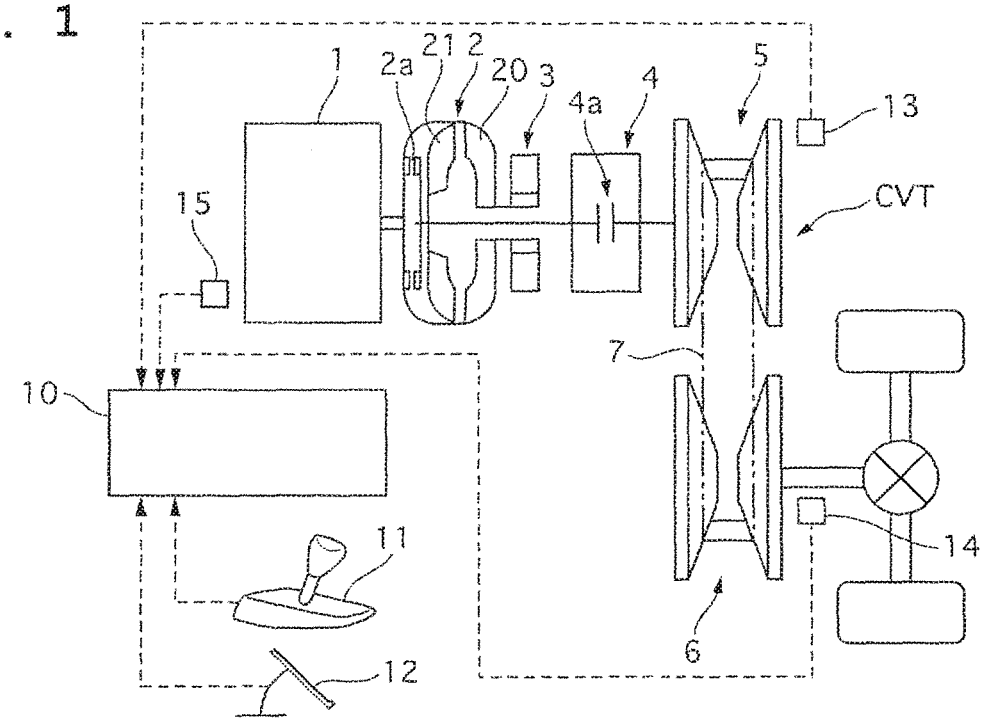
FIG. 1 is a system diagram showing a control device of a continuously variable transmission according to an embodiment 1.

FIG. 1 is a system diagram showing a control device of a continuously variable transmission according to an embodiment 1. A vehicle of the embodiment 1 has an engine 1 that is an internal combustion engine, a continuously variable transmission and a belt-type continuously variable transmission mechanism CVT, and a driving force is transmitted to a driving wheel through a differential gear. The continuously variable transmission has a torque convertor 2, an oil pump 3, a forward-reverse switching mechanism 4 and the belt-type continuously variable transmission mechanism CVT. The torque convertor 2 has a pump impeller 20 rotating integrally with a driving pawl that is connected to the engine 1 and drives the oil pump 3, a turbine runner 21 connected to an input side of the forward-reverse switching mechanism 4 (an input shaft of the belt-type continuously variable transmission mechanism CVT) and a lock-up clutch 2a being able to integrally connect these pump impeller 20 and turbine runner 21. The forward-reverse switching mechanism 4 is formed from a planetary gear mechanism and a plurality of clutches 4a, and switches between forward travel and reverse travel by engagement states of the clutches 4a. The belt-type continuously variable transmission mechanism CVT has a primary pulley 5 connected to an output side of the forward-reverse switching mechanism 4 (an input shaft of the continuously variable transmission mechanism), a secondary pulley 6 rotating integrally with the driving wheel and a belt 7 wound around both the primary pulley 5 and the secondary pulley 6 and transmitting power.

A control unit 10 reads a range position signal (hereinafter, respectively called P-range, R-range, N-range and D-range) from a shift lever 11 that selects a range position by driver's operation, an accelerator pedal opening signal (hereinafter, called APO) from an accelerator pedal opening sensor of an accelerator pedal 12, a primary rotation speed signal Npri from a primary pulley rotation speed sensor 13 that detects a rotation speed of the primary pulley 5, a secondary rotation speed signal Nsec from a secondary pulley rotation speed sensor 14 that detects a rotation speed of the secondary pulley 6 and an engine rotation speed Ne from an engine rotation speed sensor 15 that detects an engine rotation speed. Here, regarding the primary rotation speed signal Npri, when the range position is D-range, the primary rotation speed signal Npri is equal to a turbine rotation speed by engagement of the clutch 4a. Therefore, hereinafter, the primary rotation speed signal Npri is also described as a turbine rotation speed Nt.

The control unit 10 controls an engagement state of the clutch 4a according to the range position signal. More specifically, when the range position is P-range or N-range, the clutch 4a is disengaged. When the range position is R-range, a reverse clutch (or a brake) is engaged so that the forward-reverse switching mechanism 4 outputs a reverse rotation. When the range position is D-range, a forward clutch 4a is engaged so that the forward-reverse switching mechanism 4 outputs a forward rotation with the forward-reverse switching mechanism 4 integrally rotating. Further, the control unit 10 calculates a vehicle speed VSP on the basis of the secondary rotation speed Nsec. In the control unit 10, a shift map by which an optimum fuel economy state can be achieved according to a vehicle travelling condition is set. A target transmission ratio (corresponding to a predetermined transmission ratio) is set on the basis of the APO signal and the vehicle speed VSP according to the shift map. A hydraulic pressure of each pulley is controlled by feed-forward control on the basis of the target transmission ratio, and an actual transmission ratio is detected on the basis of the primary rotation speed signal Npri and the secondary rotation speed signal Nsec, then the hydraulic pressure of each pulley is feedback-controlled so that the set target transmission ratio and the actual transmission ratio become equal to each other.

Figure 2:
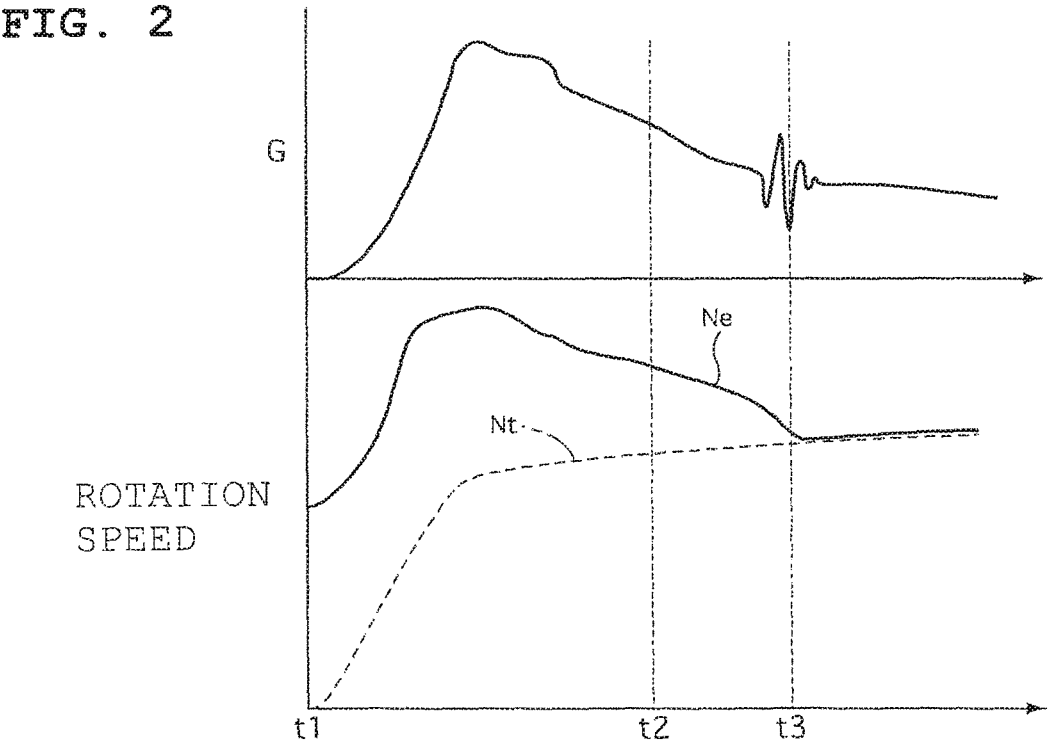
FIG. 2 is a time chart showing a relationship between a back-and-forth acceleration (a longitudinal acceleration), an engine rotation speed and a turbine rotation speed associated with engagement of a lock-up clutch.

Here, problems occurring upon engagement of the lock-up clutch 2a in a configuration of the embodiment 1 will be explained. FIG. 2 is a time chart showing a relationship between a back-and-forth acceleration (a longitudinal acceleration) G, the engine rotation speed Ne and the turbine rotation speed Nt associated with the engagement of the lock-up clutch after the vehicle starts.

At time t1, when a driver depresses the accelerator pedal 12 from a vehicle stop state, the engine rotation speed Ne increases, and an engine torque is transmitted to the turbine runner 21 with the engine torque amplified by the torque convertor 2, then the turbine rotation speed Nt also increases. The vehicle thus starts.

At time t2, when the vehicle speed VSP increases and reaches a predetermined vehicle speed VSP1, an engagement command of the lock-up clutch 2a is outputted for the purpose of improving fuel economy. By and with shift of the lock-up clutch 2a from a disengagement state to an engagement state, a rotation speed difference $\Delta N$ between the engine rotation speed Ne and the turbine rotation speed Nt gradually becomes smaller. Here, at the vehicle start, a transmission ratio of the belt-type continuously variable transmission mechanism CVT is set as a lowest transmission ratio, and up-shift to High side is gradually done with increase in the vehicle speed VSP. Therefore, increase in the turbine rotation speed Nt is more suppressed, as the up-shift is done.

At time t3, when the rotation speed difference $\Delta N$ is substantially 0 (zero), the engagement of the lock-up clutch 2a is completed. At this time, if there are variations in a difference between coefficient of static friction and coefficient of dynamic friction of friction material of the lock-up clutch 2a, a change occurs in torque transmitted by the lock-up clutch 2a, and there arises a problem of causing vibrations (judder) of the back-and-forth acceleration (the longitudinal acceleration) G of the vehicle. In particular, the engagement of the lock-up clutch 2a in a situation in which the increase in the turbine rotation speed Nt is suppressed by the up-shift of the belt-type continuously variable transmission mechanism CVT lowers the engine rotation speed Ne toward the turbine rotation speed Nt, and this causes the following problems: torque amplification effect of the torque convertor 2 greatly varies, and because an engine load increases, amplitude of vibration of the vehicle becomes great.

Therefore, in the embodiment 1, a lock-up transmission control operation, which when the lock-up clutch 2a is shifted from the disengagement state to the engagement state, controls the transmission ratio of the belt-type continuously variable transmission mechanism CVT so that the turbine rotation speed Nt approaches the engine rotation speed Ne more than a case where the transmission ratio is controlled by a normal transmission ratio control, is introduced.

Figure 3:
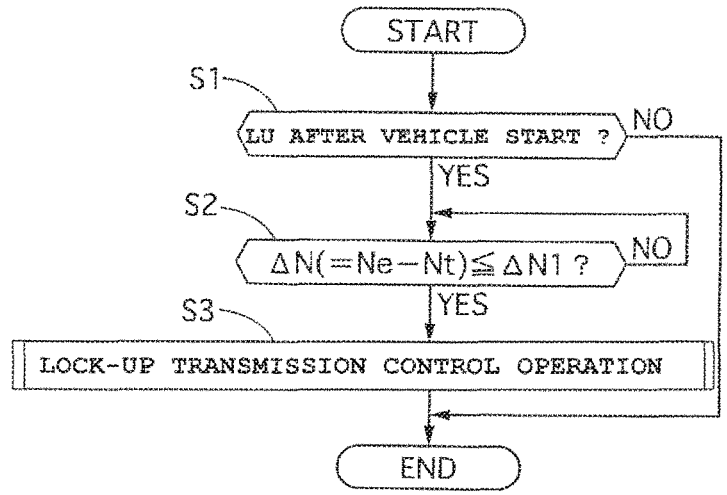
FIG. 3 is a flow chart showing a lock-up transmission control operation according to the embodiment 1.

FIG. 3 is a flow chart showing the lock-up transmission control operation according to the embodiment 1.

At step S1, on the basis of judgment of a lock-up clutch engagement control start, a judgment is made as to whether or not there is an engagement request of the lock-up clutch 2a after the vehicle start. If YES, the routine proceeds to step S2. If NO, the present control flow is ended. The lock-up clutch engagement control starts on the basis of the vehicle speed VSP and the accelerator pedal opening APO.

At step S2, a judgment is made as to whether or not the rotation speed difference $\Delta N$ (=Ne–Nt) is a predetermined rotation speed difference $\Delta N1$ or less. If the rotation speed difference $\Delta N$ is the predetermined rotation speed difference $\Delta N1$ or less, the routine proceeds to step S3. If NO, the present step is repeated.

At step S3, the lock-up transmission control operation is carried out. Here, since the turbine rotation speed Nt is determined by a current vehicle speed VSP and a current transmission ratio, when obtaining a desired turbine rotation speed Nt, by controlling the belt-type continuously variable transmission mechanism CVT to a transmission ratio G0 calculated from the current vehicle speed VSP and the desired turbine rotation speed Nt, the lock-up transmission control operation is realized. During execution of the lock-up transmission control operation, when setting the target transmission ratio, instead of a predetermined transmission ratio determined from a normal shift map, the hydraulic pressure of each pulley is controlled with the transmission ratio G0 being the target transmission ratio.

Figure 4:
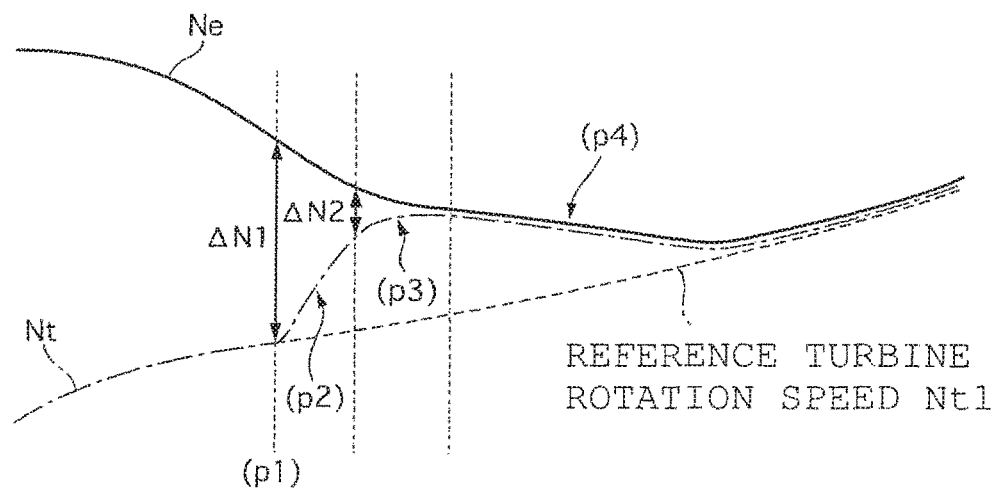
FIG. 4 is an explanatory drawing showing a detail of the lock-up transmission control operation according to the embodiment 1.

FIG. 4 is an explanatory drawing showing a detail of the lock-up transmission control operation according to the embodiment 1. This explanatory drawing shows a relationship between the engine rotation speed Ne and the turbine rotation speed Nt from a time period when the engagement command of the lock-up clutch 2a is outputted to a time period when the lock-up transmission control operation is ended.

Figure 5:
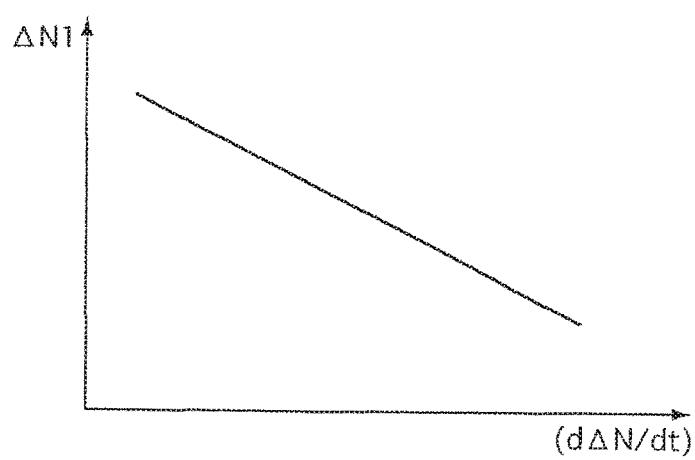
FIG. 5 is a predetermined rotation speed difference setting map according to the embodiment 1.

Phase p1 indicates a timing with which the rotation speed difference $\Delta N$ reaches the predetermined rotation speed difference $\Delta N1$. This predetermined rotation speed difference ΔN1 is determined according to a change speed d (ΔN)/dt of the rotation speed difference ΔN. FIG. 5 is a predetermined rotation speed difference setting map according to the embodiment 1. As shown in FIG. 5, the greater the change speed d (ΔN)/dt is, the smaller value the predetermined rotation speed difference ΔN1 is set to. When the lock-up clutch 2a is shifted from the disengagement state to the engagement state, since the rotation speed difference ΔN changes to a direction in which the rotation speed difference ΔN becomes smaller, the change speed d (ΔN)/dt becomes greater as an absolute value toward a minus side, and a horizontal axis of FIG. 5 has zero at a right side of FIG. 5.

That is, when engaging the lock-up clutch 2a and bringing the rotation speed difference ΔN to 0 (zero), if the change of the rotation speed difference ΔN is slow, it takes time to completely engage the lock-up clutch 2a. Therefore, by setting the predetermined rotation speed difference ΔN1 to be small, a time from the start to the end of the lock-up transmission control operation is prevented from being too long. Further, when the rotation speed difference ΔN slowly decreases, also a change speed of decrease of the engine rotation speed is relatively small. Therefore, even if an amount by which the transmission ratio of the belt-type continuously variable transmission mechanism CVT is controlled so that the turbine rotation speed Nt approaches the engine rotation speed Ne due to the transmission ratio of the lock-up transmission control operation is small, it can be said that the great variation of the torque amplification effect of the torque convertor 2 and the increase in the engine load are small and the amplitude of vibration of the vehicle is less apt to be large. On the other hand, in a case where the rotation speed difference ΔN rapidly decreases, if the predetermined rotation speed difference is set to the same predetermined rotation speed difference ΔN1 as that when the rotation speed difference ΔN slowly decreases, the time from the start to the end of the lock-up transmission control operation becomes short. Therefore, by setting the predetermined rotation speed difference ΔN1 to be larger than that when the rotation speed difference ΔN slowly decreases, the time from the start to the end of the lock-up transmission control operation can be secured. With this setting, even when the rotation speed difference ΔN rapidly decreases, the transmission ratio of the belt-type continuously variable transmission mechanism CVT can be adequately controlled by the transmission ratio of the lock-up transmission control operation so that the turbine rotation speed Nt approaches the engine rotation speed Ne. It is thus possible to reduce the great variation of the torque amplification effect of the torque convertor 2 and the increase in the engine load and suppress the amplitude of vibration of the vehicle.

Figure 6:
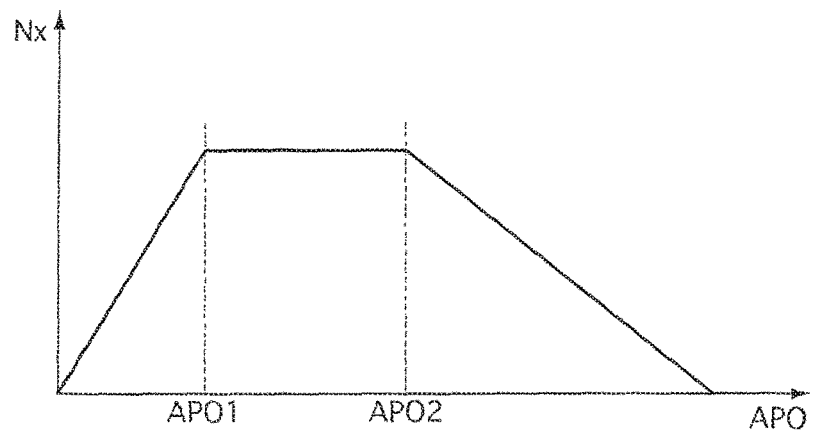
FIG. 6 is a turbine rotation speed correction amount setting map according to the embodiment 1.

In phase p2, after the rotation speed difference ΔN becomes the predetermined rotation speed difference ΔN1 or less, a transmission ratio by which the turbine rotation speed Nt increases at a predetermined increase gradient that is previously set is set. Here, the predetermined increase gradient is set on the basis of the accelerator pedal opening APO. FIG. 6 is a turbine rotation speed correction amount setting map according to the embodiment 1. Up to a predetermined low opening APO1, the greater the accelerator pedal opening APO is, the greater value the turbine rotation speed correction amount Nx is set to, then the predetermined increase gradient is set to a large increase gradient. With this setting, as an acceleration demand is stronger, the lock-up clutch 2a can be fully engaged more quickly, and this meets driver's acceleration demand. Further, when the accelerator pedal opening APO is greater than a predetermined opening APO2, the greater the accelerator pedal opening APO is, the smaller value the turbine rotation speed correction amount Nx is set to. The reason of this is because when the accelerator pedal opening APO is greater than the predetermined opening APO2, an engine torque is sufficiently outputted, then odd or awkward feeling associated with an engagement shock is small.

At the vehicle start, regarding the predetermined transmission ratio set from the above mentioned shift map, by gradually up-shifting the transmission ratio from the lowest side to High side, fuel economy can be improved (see a dotted line in FIG. 4). The transmission ratio G0 achieving a corrected turbine rotation speed Nt that is obtained by adding the turbine rotation speed correction amount Nx to the turbine rotation speed Nt that corresponds to the predetermined transmission ratio is set.

By the correction of the turbine rotation speed, for instance, there are cases where the transmission ratio of the belt-type continuously variable transmission mechanism CVT is held at a transmission ratio of the present time (at a relatively low side transmission ratio) and up-shift to High side is forbidden and where down-shift toward Low side is done. If the transmission ratio of the belt-type continuously variable transmission mechanism CVT is up-shifted in a situation in which the vehicle speed VSP is increasing, decrease or increase of the turbine rotation speed Nt is suppressed. In contrast to this, by shifting the transmission ratio of the belt-type continuously variable transmission mechanism CVT to the Low side, the turbine rotation speed Nt can also be increased more quickly with increase in the vehicle speed VSP than the case where the transmission ratio of the belt-type continuously variable transmission mechanism CVT is controlled by and at the predetermined transmission ratio.

In phase p3, after the rotation speed difference ΔN is less than a predetermined rotation speed difference ΔN2 and it is judged that the lock-up clutch 2a is in a state immediately before the full engagement, rate of change of the rotation speed difference ΔN is lowered. With this, it is possible to suppress an inertia shock caused by sudden change of the rotation speed of the continuously variable transmission mechanism CVT upon the full engagement. Here, the predetermined rotation speed difference ΔN2 could be a fixed value. Or alternatively, the greater the change speed d (ΔN)/dt is, the greater value the predetermined rotation speed difference ΔN2 is set to. With this setting, the engagement shock associated with the full engagement is suppressed.

In phase p4, after the full engagement is confirmed, the transmission ratio is controlled so that a current turbine rotation speed Nt is directed toward a reference turbine rotation speed Nt1 that corresponds to the predetermined transmission ratio determined by the vehicle speed VSP and the accelerator pedal opening APO of the present time. At this time, the transmission ratio is controlled so that rate of change of a difference ΔNt between the current turbine rotation speed Nt and the reference turbine rotation speed Nt1 becomes a predetermined rate of change that is previously set. With this control, sudden change of the engine rotation speed Ne and the turbine rotation speed Nt is suppressed, and a stable acceleration state is achieved.

Figure 7:
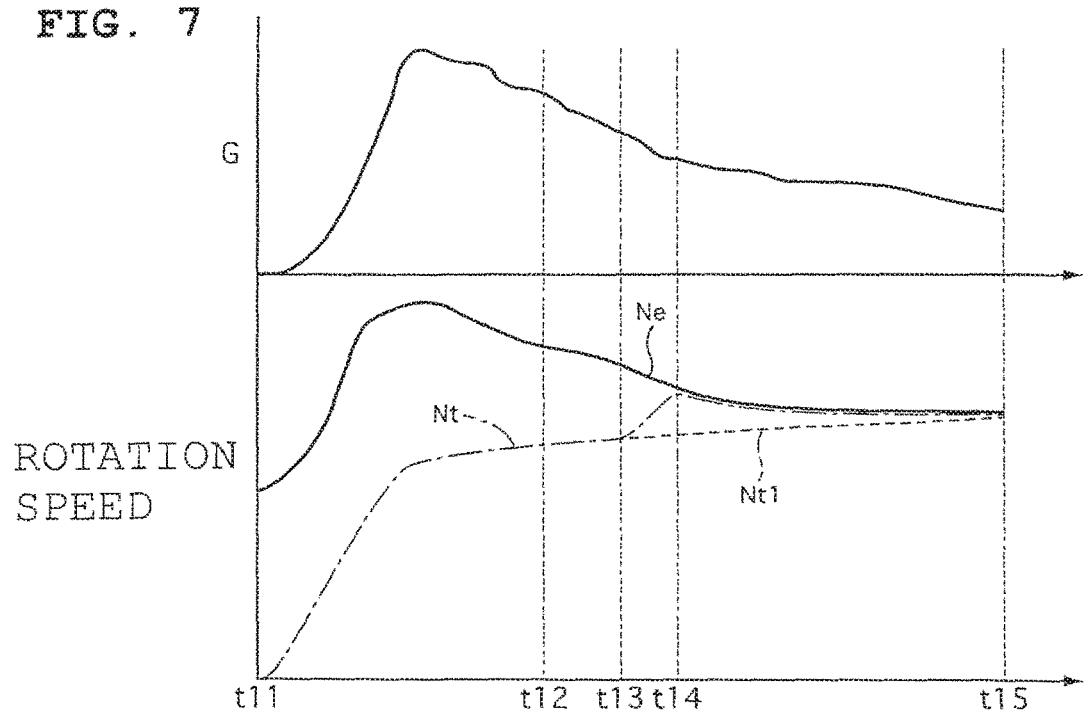
FIG. 7 is a time chart showing a relationship between a back-and-forth acceleration (a longitudinal acceleration) G, an engine rotation speed Ne and a turbine rotation speed Nt when performing the lock-up transmission control operation of the embodiment 1.

FIG. 7 is a time chart showing a relationship between the back-and-forth acceleration (the longitudinal acceleration) G, the engine rotation speed Ne and the turbine rotation speed Nt when performing the lock-up transmission control operation of the embodiment 1.

At time t11, when the driver depresses the accelerator pedal 12 from a vehicle stop state, the engine rotation speed Ne increases, and an engine torque is transmitted to the turbine runner 21 with the engine torque amplified by the torque convertor 2, then the turbine rotation speed Nt also increases. The vehicle thus starts.

At time t12, when the vehicle speed VSP increases and reaches the predetermined vehicle speed VSP1, an engagement command of the lock-up clutch 2a is outputted. By and with shift of the lock-up clutch 2a from the disengagement state to the engagement state, the rotation speed difference ΔN between the engine rotation speed Ne and the turbine rotation speed Nt gradually becomes smaller.

At time t13, when the rotation speed difference ΔN becomes the predetermined rotation speed difference ΔN1 or less, the lock-up transmission control starts, and the turbine rotation speed Nt increases toward the engine rotation speed Ne. In other words, in a time period from time t13 to time t14, the turbine rotation speed Nt approaches the engine rotation speed Ne at a faster speed than that at which the turbine rotation speed Nt has approached the engine rotation speed Ne before the time t13. With this control, the torque amplification effect of the torque convertor 2 is reduced and the engine load is lightened, then the lowering of the engine rotation speed Ne is suppressed.

At time t14, when the lock-up clutch 2a is fully engaged, after that, the transmission control is done so that the turbine rotation speed Nt is directed toward the reference turbine rotation speed Nt1. At time t15, when the turbine rotation speed Nt reaches the reference turbine rotation speed Nt1, the lock-up transmission control operation is ended, and the control is shifted to a normal transmission control.

By this lock-up transmission control operation, the lock-up clutch 2a can be smoothly engaged. And even if variations in a difference between coefficient of static friction and coefficient of dynamic friction of friction material of the lock-up clutch 2a exist, it is possible to suppress the change in torque transmitted by the lock-up clutch 2a and the vibrations of the back-and-forth acceleration (the longitudinal acceleration) G of the vehicle.

As explained above, the embodiment can provide the following operation and effect.

(1) A control device for a continuously variable transmission comprises: an engine 1; a continuously variable transmission mechanism CVT transmitting power with a belt 7 wound around a primary pulley 5 and a secondary pulley 6; a torque convertor 2 provided between the engine 1 and the continuously variable transmission mechanism CVT, the torque convertor 2 having a pump impeller 20 rotating integrally with the engine 1, a turbine runner 21 rotating integrally with an input shaft of the continuously variable transmission mechanism CVT and a lock-up clutch 2a connecting the pump impeller 20 and the turbine runner 21; and a control unit (control means) 10 controlling the lock-up clutch 2a to a predetermined engagement state and controlling the continuously variable transmission mechanism CVT to a predetermined transmission ratio, according to a travelling condition, and the control unit 10 is configured to, when shifting the lock-up clutch 2a from a disengagement state to an engagement state, control a transmission ratio of the continuously variable transmission mechanism CVT so that when a rotation speed difference ΔN between an engine rotation speed Ne and a turbine rotation speed Nt (a rotation speed of the turbine runner 21) is a predetermined rotation speed difference ΔN1 or less, the turbine rotation speed (Nt) approaches the engine rotation speed Ne more than a turbine rotation speed Nt1 of a case where control of a transmission ratio of the continuously variable transmission mechanism CVT, which is set according to the travelling condition during the shift of the lock-up clutch 2a, is continued.

Therefore, by bringing the turbine rotation speed Nt closer to the engine rotation speed Ne without excessively lowering the engine rotation speed Ne, the torque amplification effect of the torque convertor 2 can be suppressed at an early stage. Further, the lock-up clutch 2a can be shifted from the disengagement state to the engagement state while lightening the engine load by suppressing the lowering of the engine rotation speed Ne, and even if variations in coefficient of friction exist, the lock-up clutch 2a can be stably fully engaged. It is therefore possible to prevent the odd or awkward feeling associated with change of the longitudinal acceleration from being given to the driver. Moreover, as mentioned above, the transmission ratio G0 achieving the corrected turbine rotation speed Nt that is obtained by adding the turbine rotation speed correction amount Nx to the turbine rotation speed Nt that corresponds to the predetermined transmission ratio is set. It is thus possible to bring the turbine rotation speed even closer to the engine rotation speed, as compared with a turbine rotation speed of a case where the control of the transmission ratio of the continuously variable transmission mechanism CVT, which is set on the basis of the travelling condition during the shift of the lock-up clutch 2a from the disengagement state to the engagement state, is continued. Consequently, even in a state in which the transmission ratio is held, or even in a state of up-shift or down-shift, it is possible to bring the turbine rotation speed even closer to the engine rotation speed, as compared with turbine rotation speeds of cases where the respective controls are continued.

(2) The smaller the change speed d (ΔN)/dt of the rotation speed difference ΔN is, the greater value the predetermined rotation speed difference ΔN1 is set to.

Therefore, it is possible to suppress a deviation of rotational angle acceleration between the engine rotation speed Ne and the turbine rotation speed Nt while shortening a time required for the full engagement of the lock-up clutch 2a, and stable engagement of the lock-up clutch 2a can be achieved.

The invention claimed is:

1. A control device for a continuously variable transmission comprising:
    a continuously variable transmission mechanism transmitting power with a belt wound around a primary pulley and a secondary pulley;
    a torque convertor provided between an engine and the continuously variable transmission mechanism, the torque convertor having a pump impeller rotating integrally with the engine, a turbine runner rotating integrally with an input shaft of the continuously variable transmission mechanism and a lock-up clutch connecting the pump impeller and the turbine runner; and
    a control unit controlling the lock-up clutch to a predetermined engagement state and controlling the continuously variable transmission mechanism to a predetermined transmission ratio, according to a travelling condition, and
    the control unit being configured to, when shifting the lock-up clutch from a disengagement state to an engagement state, control a transmission ratio of the continuously variable transmission mechanism so that when a rotation speed difference between an engine rotation speed and a turbine rotation speed that is a rotation speed of the turbine runner is a predetermined rotation speed difference or less, the turbine rotation speed approaches the engine rotation speed more closely than a turbine rotation speed in a case where control of a transmission ratio of the continuously variable transmission mechanism, which is set according to the travelling condition during a shift of the lock-up clutch, is continued.

2. The control device for the continuously variable transmission as claimed in claim 1, wherein:

the smaller that a change speed of the rotation speed difference is, the greater value the predetermined rotation speed difference is set to.

3. The control device for the continuously variable transmission as claimed in claim 1, wherein:

the control unit is configured to set the transmission ratio so as to increase the turbine rotation speed according to a predetermined increase gradient, after the rotation speed difference becomes the predetermined rotation speed difference or less.

4. The control device for the continuously variable transmission as claimed in claim 1, wherein:

the control unit is configured to determine a turbine rotation speed correction amount, and to set the turbine rotation speed correction amount to be smaller when an accelerator pedal opening exceeds a predetermined opening than when the accelerator pedal opening is less than the predetermined opening.

5. The control device for the continuously variable transmission as claimed in claim 4, wherein:

the control unit is configured to set the turbine rotation speed to a sum of a turbine rotation speed correction amount and a turbine rotation speed corresponding to the predetermined transmission ratio.

6. The control device for a continuously variable transmission as claimed in claim 1, wherein:

when the rotation speed difference is the predetermined rotation speed difference or less, the turbine rotation speed approaches the engine rotation speed more closely than a turbine rotation speed in a case where the transmission ratio is set based on a shift map.

* * * * *